Patented Aug. 9, 1938

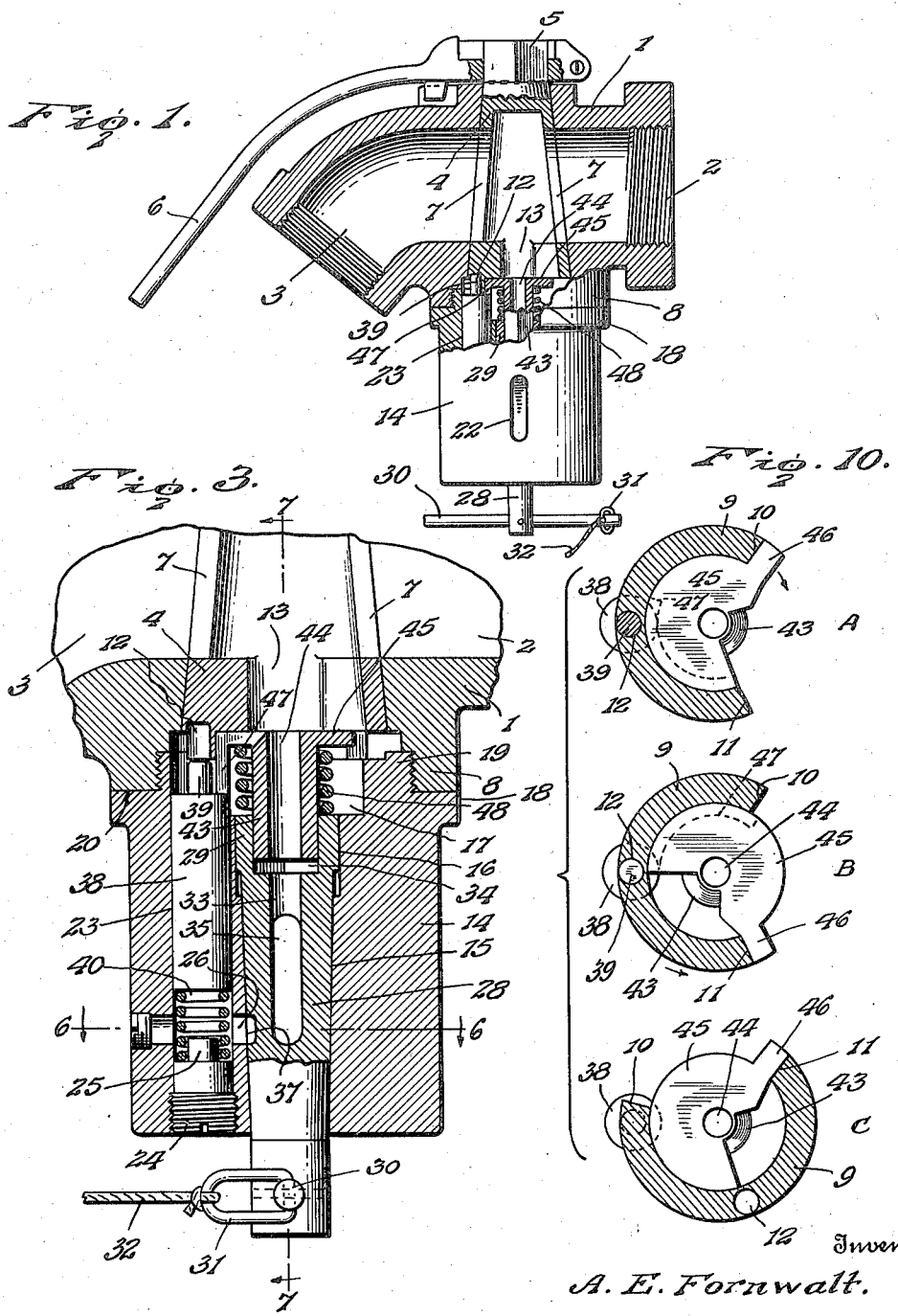

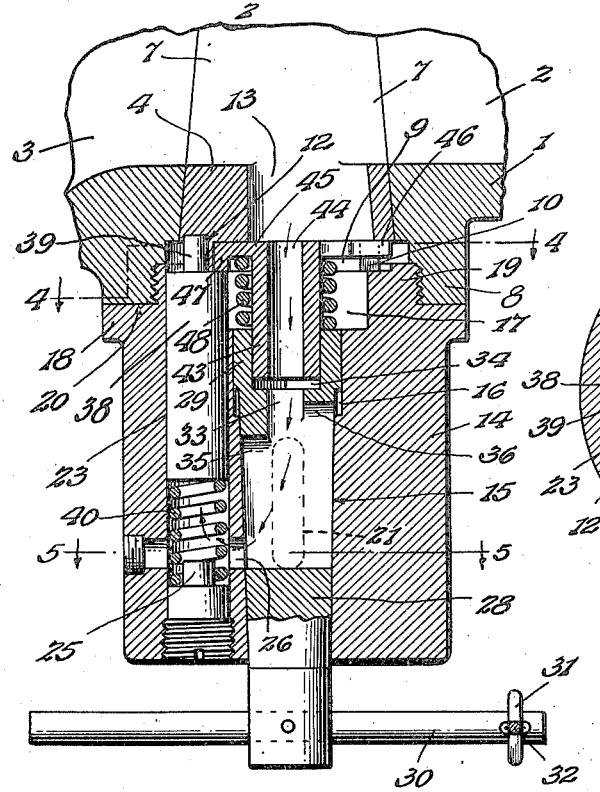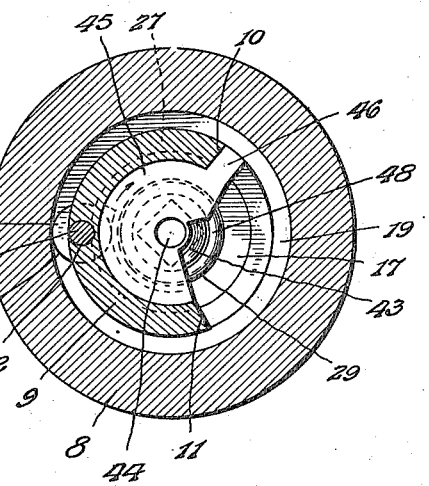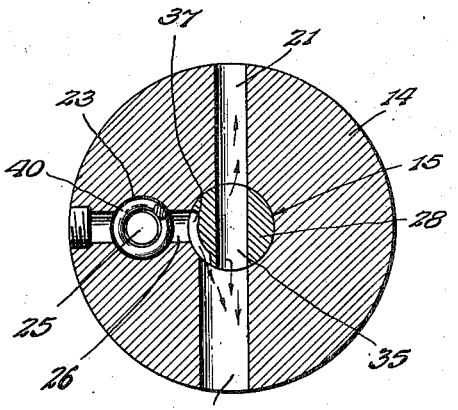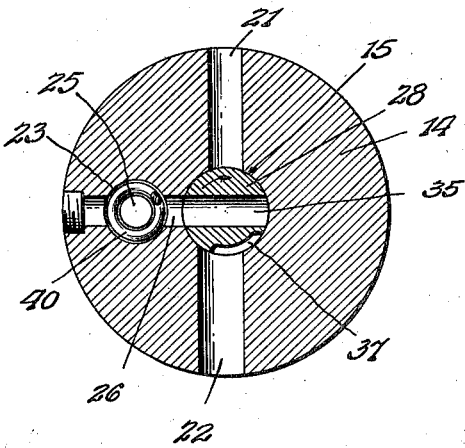

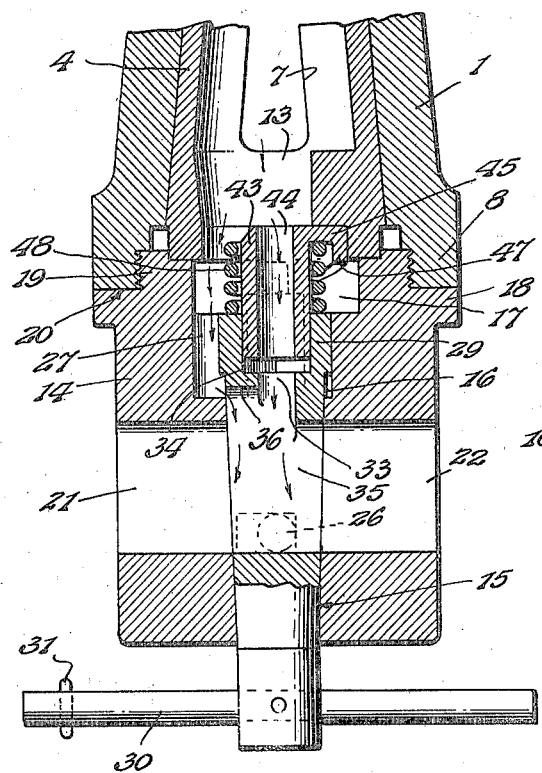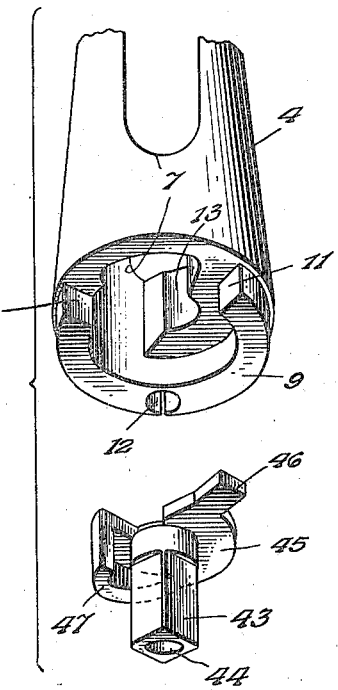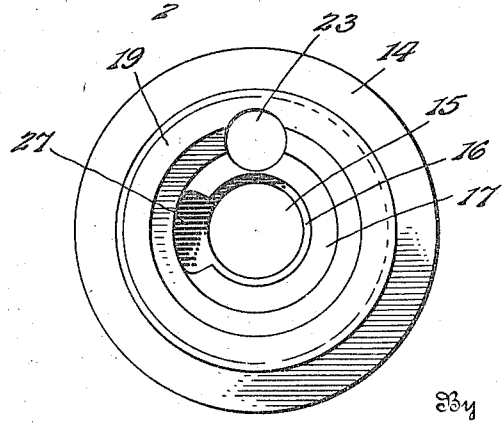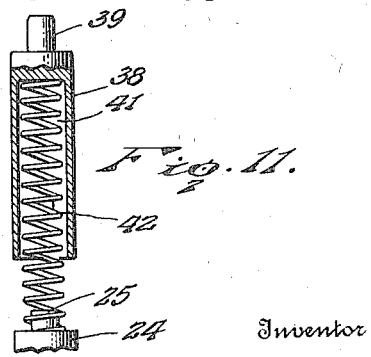

2,126,101

UNITED STATES PATENT OFFICE 2,126,101

TRAIN PIPE VALVE

Alexander E. Fornwalt, Johnstown, Pa.

Application June 22, 1936, Serial No. 86,675

3 Claims. (Cl. 277—39)

This invention relates to an improved car line brake pipe valve and one object of the invention is to provide a valve of such construction that the valve plug after being opened will be locked and cannot be turned to a closed position without bleeding the train line and thus causing operation of the triple valve of the air brake system for applying the brakes. It will thus be seen that a brake pipe valve between cars of a train cannot be tampered with by an unauthorized person without applying the brakes of all of the cars of the train and thus indicating to the trainmen that one or more of the valves has been closed by an unauthorized person.

Another object of the invention is to provide the valve with improved means for locking the valve plug in the opened position including a plunger movable by air pressure into position to lock the valve plug in the opened position, the locking mechanism also including a cam adapted to force the plunger out of engagement with the valve plug and thus prevent the plunger from sticking and failing to move to a releasing position when the locking mechanism is turned into position for bleeding the air pipes.

Another object of the invention is to so construct and mount the cam that the locking mechanism cannot be turned to a releasing position in which air may bleed from the air brake system without the cam being turned and forcing the plunger out of engagement with the valve plug, it being also an object of the invention to provide a device of this character wherein the plunger is urged towards a locking position by a spring in addition to air pressure and thus insure quick movement of the plunger to a locking position.

Another object of the invention is to so form the device that when it is adjusted to permit bleeding of the air brake system, air will not only pass through a main air passage but also through an auxiliary air passage and the brake system thus quickly set in operation to apply the brakes.

Another object of the invention is the provision of a device of this character which is simple in construction and consists of a comparatively few number of parts so constructed and assembled that the device will operate efficiently in either warm or cold weather and will not be rendered inoperative by ice or dirt collecting therein and causing the plunger to stick.

The invention is illustrated in the accompanying drawings, wherein

Figure 1 is a view partially in elevation and partially in section and showing the improved locking mechanism applied to a valve with the valve plug locked in the opened position.

Figure 2 is an enlarged sectional view taken vertically through the improved locking mechanism and a portion of the valve to which it is applied.

Figure 3 is a view similar to Figure 2 but showing the valve plug released and a valve member forming part of the locking mechanism in such position that air may bleed from the air brake system and cause the brakes to be applied.

Figure 4 is a sectional view, taken along the line 4—4 of Figure 2.

Figure 5 is a sectional view, taken along the line 5—5 of Figure 2.

Figure 6 is a sectional view, taken along the line 6—6 of Figure 3.

Figure 7 is a vertical sectional view, taken along the line 7—7 of Figure 3.

Figure 8 is a view looking down upon the valve of the locking mechanism.

Figure 9 is a group view in perspective of parts of the improved locking mechanism.

Figure 10 is a diagrammatic view showing three positions into which elements of the device are moved during adjustment of the auxiliary valve or lock.

Figure 11 is a view partially in elevation and partially in section of a modified form of plunger.

The car line brake pipe valve to which this auxiliary valve and lock is applied is formed with the usual casing 1 having an inlet 2 and an outlet 3. An upwardly tapered bore is formed through the valve casing to receive the usual tapered valve plug 4 terminating in the usual squared end 5 for engagement by the operating handle or lever 6 by means of which the valve plug is to be turned from a closed position to an opened position in which its side ports 7 will face the inlet and outlet and air may pass through the valve and car line pipe from one car to another. An internally threaded neck 8 extends downwardly from the valve body for engagement with the auxiliary valve and lock but it is to be understood that the auxiliary valve may be detachably mounted in any other desired manner. The base of the valve plug carries a depending arcuate flange 9 which extends partially about the margins of the base or lower end face of the plug with its ends 10 and 11 spaced from each other and intermediate its length this flange is formed with a socket 12. A bore or air passage 13 is formed through the base of the valve plug and referring particularly to Figures 7 and 8 it will be seen that this bore or air passage has been enlarged instead of being formed as a straight bore. The purpose of enlarging the bore or air passage will be hereinafter fully set forth.

The auxiliary valve and lock which is applied to the valve casing 1 has a body or casing 14 formed of brass or any other strong metal desired. A tapered bore 15 is formed axially through the body or casing with its upper portion enlarged to form a pocket 16 and above this pocket additionally enlarged to form a chamber 17. An outstanding flange 18 surrounds the upper portion of the valve body or casing 14 which may be formed with flat wrench-engaging marginal faces if so desired so that the reduced and externally threaded upper end of the body may be easily screwed tightly into the neck 8 with the annular shoulder 20 in flat contacting engagement with the face of the collar 8. Formation of the flange 18 with wrench engaging faces is not necessary as the handle 6 or an equivalent turning implement may be engaged in one of the passages 21 or 22 formed in the valve body or casing and extending radially thereof in opposed relation to each other with their inner ends communicating with the bore 15. In spaced relation to one side of the bore or socket 15, the valve body has been drilled longitudinally to form a pocket 23 closed at its inner end by a threaded plug 24 and upon referring to Figures 2 and 3, it will be seen that the inner end portion of this plug is reduced to form a lug or finger 25 which is of sufficient length to project upwardly partially across the port 26 connecting the pocket 23 with the bore or socket 15. The pocket 23 is open at its upper end and by referring to Figures 2 and 3, it will be seen that at its inner side the upper portion of this pocket communicates with the pocket 17. There has also been provided a recess 27 formed in the side wall of the pocket 16 and extending the full depth thereof as shown in Figure 7 with its upper end leading from the pocket 7 and constituting an auxiliary air passage.

A valve plug 28, which tapers downwardly to substantially conform to the taper of the bore or socket 15, fits into this socket and has its upper end portion of increased diameter to form a head 29 which is of even diameter throughout its depth and is snugly received in the pocket 16. It should be noted that the annular shoulder forming the lower marginal edge face of the head 29 is spaced from the bottom of the pocket 16, as shown in Figures 1, 2 and 7 and, therefore, the valve plug when inserted may be forced downwardly to a position in which it has wedging fit in the bore 15. Therefore, a tight joint will be formed between the valve plug and walls of the bore 15 to prevent leakage but this valve plug may be turned when opening or closing the auxiliary valve. A turning bar 30 which is passed diametrically through the projecting lower end portion of the valve plug constitutes a handhold to be grasped with one or both hands when turning the valve plug, but it is to be understood that any convenient means may be used as a handhold. It should also be noted that this handle bar carries an eye or link 31 to which is secured one end of a pull cord 32 which may be of any length and extends from the link to a side of a railway car where it may be connected with an operating pedal or the like or merely tied to a handle or step of a car. By this arrangement the trainmen may easily exert pull upon the pull cord and effect opening of the auxiliary valve without going between two cars.

An air passage or bore 33 is formed longitudinally of the valve plug axially thereof and has its upper portion enlarged to form a flared socket 34 and its lower portion communicating with a transverse passage 35, a portion 36 of which extends upwardly a sufficient distance to communicate with the lower portion of the pocket 16 and register with the lower end of the auxiliary air passage or recess 27 when the valve plug is in the position shown in Figure 7. The transverse passage 35 may be disposed either transversely of the passages 21 and 22, as shown in Figure 5, in which position bleeding of the air brake system will be cut off and communication established through the port 26 with the lower end portion of the pocket 23 or the transverse passage may be alined with the passages 21 and 22, in which case air may flow outwardly through the side passages, as indicated by the arrows in Figure 6 and cause the brakes to be applied. When the valve plug is in the position shown in Figure 6, a groove or air passage 37 extending partially about the circumference of the plug, establishes communication between the port 26 and the passage 22 so that air may escape from the lower portion of the pocket 23. The reason for establishing communication between the port 26 and the passage 22 will be hereinafter set forth.

In order to lock the plug 4 of the main valve when moved to an opened position and prevent this plug from being turned to a closed position through the medium of the handle or lever 6 without warning the train crew, there has been provided a plunger 38 which is formed of steel or other strong metal and fits snugly within the pocket 23 for sliding movement therein. The upper end portion of this plunger is reduced to form a lug or latching finger 39 of the proper diameter to be received in the socket 12 and in order to urge the plunger upwardly and cause it to quickly move into position for engagement of the lug or finger in the socket, there has been provided a helical spring 40 which is received in the lower portion of the pocket 23 with its upper end bearing against the lower end of the plunger and its lower portion seated upon the inner end of the plug 24 about the pin 25 thereof. If so desired, the plunger may be hollowed, as shown at 41 in Figure 11, in which case the helical spring 42 which is of greater length than the spring 40 will fit within the plunger and thus be braced against transverse strain and this plunger is urged upwardly and maintained in an elevated position by compressed air which enters the lower end of the pocket 23 through the port 26 when the valve plug 28 is in the closed position shown in Figure 2 and bleeding of the air brake system through the auxiliary valve prevented, but, by providing the spring which is at all times under tension and additionally tensioned when the plunger is moved downwardly to withdraw the lug 39 from the socket 12, the plunger will be quickly restored to a locking position when the auxiliary valve is shut off and prevented from failing to move upwardly due to sticking in the pocket.

The plunger 38 must move downwardly in the pocket 23 in order to release the plug 4 of the main valve and in order to do so, there has been provided a key or actuating member having a hollow shank 43 formed with an axially extending passage 44 through which air passes to the bore or passage 33 when the shank of the key is engaged in the pocket 34 of the valve plug 28. At its upper end, the shank carries a circumferentially extending flange 45 which extends about the upper end of the shank for the major portion of its circumference and at one end carries an outwardly extending radially disposed finger 46 adapted to make contact with the shoulders 10 and 11 of the flange 9 and thus limit the extent to which the key and the valve plug 28 may be turned. The other end portion of the flange 45 carries a depending lip 47 which is substantially triangular in shape when viewed in side elevation. Therefore, the lip is formed with a sloping lower edge face and constitutes a cam, the lower edge of which bears against the upper end of the plunger at one side of the lug 39. A helical spring 48, which surrounds the shank of the key and exerts pressure to cause the valve plugs 4 and 28 to have wedging fit in the bores of the main valve and auxiliary valve, holds the flange 45 in close contacting engagement with the lower end of the valve plug of the main valve and it will be readily understood that when the valve plug 28 and key are turned from the position shown in Figure 2 to that shown in Figure 3, the cam will force the latching plunger downwardly and positively move this latching plunger to a releasing position. In view of the fact that the groove or air passage 37 registers with the port 26 and air passage 22 when the valve plug 28 is turned to the opened position shown in Figure 3 permits air to be forced from the lower portion of the pocket 23 into the air passage 22 and an air cushion will be eliminated which might retard or prevent movement of the latching plunger to the lowered position. As the latching plunger is forced downwardly by a cam action, formation of ice in the pocket 23 or corroding of the plunger cannot prevent the latching plunger from moving to the releasing position.

When this improved auxiliary valve and lock is in use, the main valve of the air pipe is equipped with a valve plug 4 of the improved construction and instead of applying the usual cap to the flange 8, the auxiliary valve is applied. The auxiliary valve extends downwardly from the main valve and the upper face of the flange 45 of the key bears against the lower end of the valve plug 4 with this flange 45 encircled by the flange 9 and the abutment finger 46 disposed between the shoulders 10 and 11 of the flange 9. The valve plug 28 of the auxiliary valve is in the closed position with the upper end of the lug or finger 39 bearing against the lower edge face of the flange 9 and when the valve plug 4 is moved to an opened position, the lug or finger will enter the socket 12 as the plunger is moved upwardly by the spring 40 and by compressed air which passes downwardly through the key and valve plug 28 and enters the lower end of the pocket 23 through the port 26. The fact that the plunger is urged upwardly by the spring instead of depending entirely upon the compressed air to force it upwardly, causes the plunger to be very quickly moved into locking engagement with the flange of the valve plug 4 and also prevent the plunger from sticking to walls of the pocket 23 and failing to move upwardly. The latching plunger cannot move downwardly as it is held in a raised position by the spring and by air pressure and, therefore, it will be impossible to move the valve plug 4 to a closed position through the medium of the lever 6 until the latching plunger has been shifted downwardly a sufficient distance to move the lug 39 out of the socket 12. In order to move the latching plunger downwardly, the valve plug 28 is turned from the closed position shown in Figures 2 and 5 to the opened position shown in Figures 3 and 6. As this valve plug 28 is turned, the key will be turned from the position indicated by the diagram A in Figure 10 to the position shown in the diagram B of Figure 10 and as this movement takes place, the cam 47 acts against the upper end of the latching plunger to force the latching plunger downwardly to the position shown in Figure 3. At the same time, the valve plug 28 is turned to the opened position in which the groove 37 registers with the port 26 and the passage 22 to allow escape of air from the lower end portion of the pocket 23 and prevent formation of an air cushion which might interfere with downward movement of the latching plunger. The two passages 21 and 22 of the valve casing or body 14 will then be in registry with opposite ends of the passage 35 of the valve plug 28 and air will bleed from the air brake system through the main valve and auxiliary valve and the brakes of the entire train will be applied. The pin or lug is withdrawn from the socket 12 when the auxiliary valve is opened, as the key turns with the valve plug 28 and the cam 47 acts against the plunger to move it downwardly. Therefore, the valve plug of the main valve may be moved to a closed position, as shown in diagram C in Figure 10 and, therefore, the train crew may close the main valve after operating the auxiliary valve when it is intended to disconnect one or more cars from a train and as the air pipe will be shut off or blocked by the closed valve, air pressure can again build up in the air brake system and render the air brake system operative and under control of the engineer of the train. It will thus be seen that the train crew can adjust the valve of the air pipe but if an unauthorized person attempts to open the main valve by turning it from the locked position shown in diagram A of Figure 10 to which it is moved from the position shown in diagram C of Figure 10 when opened, it will be securely locked and if this person should turn the valve plug of the auxiliary valve, all of the brakes of the train will be applied and the train brought to a stop or the train prevented from starting if the valve should be tampered with when the train is not in motion. The fact that the plunger 38 is urged upwardly by the spring 40, eliminates any danger of the plunger failing to move into locking engagement with the main valve plug when this plug is opened and the fact that it is forced downwardly by a cam instead of merely depending upon gravity to carry it downwardly prevents it from being held in a locking position if ice or dirt should gather in the pocket 23 and cause it to stick.

Having thus described the invention, what is claimed as new is:

1. In a valve for train line pipes, a casing, a plug rotatable therein, an auxiliary casing, a plunger in said auxiliary casing for locking the plug in an open position, a spring urging the plunger towards a locking position, an auxiliary valve plug in the auxiliary casing movable independently of the first plug from a closed position to an open position for bleeding the train line pipe, a key carried by and movable with the auxiliary plug, and a cam carried by said key for engaging the plunger and forcing the plunger out of a locking position when the auxiliary plug is turned to an open position.

2. A valve for train line pipes including a casing, a plug rotatable therein, a plunger for locking the plug in an open position, an auxiliary valve plug movable to one position for admitting pressure behind the plunger to move the plunger into a locking position, a key between the first plug and the auxiliary plug carried by the auxiliary plug and adapted to be moved by the first plug to close the auxiliary plug when the first plug is opened and movable with the auxiliary plug relative to the first plug when the auxiliary plug is moved to an open position, and a cam movable with the key to act against the plunger and shift the plunger out of locking engagement with the first plug when the auxiliary plug is moved to an open position.

3. A valve for train line pipes including a casing, a plug rotatable therein, a plunger for locking the plug in an open position, an auxiliary valve plug movable to a closed position for retaining pressure in the train line pipe when the first plug is open and admitting presure behind the plunger to hold the plunger in a locking position, a key between the first plug and the auxiliary plug movable with the auxiliary plug relative to the first plug when the auxiliary plug is moved from a closed position to an open position, a flange about the upper end of the key bearing against the lower end of the first plug, and a depending lip carried by a marginal portion of said flange and extending circumferentially thereof and having a sloping lower edge face constituting a cam surface adapted to engage the plunger and force the plunger downwardly out of locking engagement with the first plug when the auxiliary plug is turned to an open position.

ALEXANDER E. FORNWALT.